(12) United States Patent  
Ohk (10) Patent No.: US 8,619,316 B2
(45) Date of Patent: Dec. 31, 2013

(54) DOCUMENT PROCESSING APPARATUS AND METHOD FOR PROCESSING DOCUMENT USING THE SAME

(75) Inventor: Hyung-soo Ohk, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1117 days.

(21) Appl. No.: 12/566,912

(22) Filed: Sep. 25, 2009

(65) Prior Publication Data

US 2010/0079822 A1  Apr. 1, 2010

(30) Foreign Application Priority Data

Sep. 30, 2008  (KR) .................. 10-2008-0096016

(51) Int. Cl.
*H04N 1/40* (2006.01)
(52) U.S. Cl.
USPC ........................... 358/1.18; 358/462; 358/468
(58) Field of Classification Search
USPC ......... 358/1.9, 2.1, 1.16, 1.18, 462, 402–404, 358/400, 500, 468, 448
See application file for complete search history.

(56) References Cited

U.S. PATENT DOCUMENTS

| 5,465,353 A | * | 11/1995 | Hull et al. ............................... 1/1 |
| 6,061,478 A | * | 5/2000 | Kanoh et al. .................. 382/305 |
| 6,104,500 A | * | 8/2000 | Alam et al. .................. 358/1.15 |
| 7,003,157 B2 | * | 2/2006 | Morita et al. ................. 382/181 |
| 8,300,963 B2 | | 10/2012 | Ohk et al. |
| 2011/0158545 A1 | | 6/2011 | Ohk et al. |

FOREIGN PATENT DOCUMENTS

| EP | 1 950 950 | 1/2008 |
| JP | 2000-316082 | 11/2000 |
| KR | 10-2007-0013157 | 1/2007 |
| KR | 10-2008-0066262 | 7/2008 |
| KR | 10-2008-0069886 | 7/2008 |

OTHER PUBLICATIONS

Korean Office Action issued Dec. 5, 2012 in corresponding Korean Application 10-2008-0096016.

* cited by examiner

*Primary Examiner* — Thomas D Lee
*Assistant Examiner* — Stephen M Brinich
(74) *Attorney, Agent, or Firm* — Staas & Halsey LLP (57) ABSTRACT

A document processing apparatus, including a symbol-related information acquirement unit which identifies a text area in a scanned document, extracts symbols from the identified text area, and acquires symbol-related information regarding each extracted symbol, a symbol division unit which divides the extracted symbols into several groups based on a preset reference value regarding the symbol-related information, and a key index generation unit which generates a key index by arranging one group of symbols from among the divided groups. Accordingly, a user can look for a desired document more easily and conveniently.

12 Claims, 11 Drawing Sheets

What makes SAMSUNG one of the world's leading componies?

How we got here

Ever since it was founded in 1938, SAMSUNG has continually refined its mission statement to respond both to change in itself and in the world: "Economic contribution to the nation, "Priority to humanresources", "Pursuit of rationalism." Each slogen represents significant moments in

FIG. 4

| B | B | B | B | B |
|---|---|---|---|---|
| B | T | B | T | B |
| B | T | T | T | B |
| B | T | B | T | B |
| B | B | B | B | B |

DOCUMENT PROCESSING APPARATUS AND METHOD FOR PROCESSING DOCUMENT USING THE SAME

CROSS-REFERENCE TO RELATED APPLICATIONS

This application claims the benefit under 35 U.S.C. §119 from Korean Application No. 10-2008-0096016, filed in the Korean Intellectual Property Office on Sep. 30, 2008, the disclosure of which is incorporated herein by reference.

BACKGROUND OF THE INVENTION

1. Field of the Invention

Aspects of the present invention relate to a document processing apparatus and method for processing a document, and more particularly, to a document processing apparatus capable of generating a key index from a scanned document, and method for processing a document using the same.

2. Description of the Related Art

Image forming apparatuses are devices for generating, printing, receiving, and transmitting image data. Examples of the image forming apparatus are printers, scanners, copiers, facsimile machines, and multifunction peripherals incorporating the aforementioned devices.

If a user requests that an image forming apparatus storing a scanned document display the stored document, the stored document can be displayed on a display window of the image forming apparatus. In this case, the user can look for a desired document using file names or thumbnail images that are displayed on the display window of the image forming apparatus.

However, file names are generally expressed in an array of numbers including dates or times, or an array of sequential numbers, so it is difficult for the user to find the desired document. In addition, even when using thumbnail images, it is not easy for the user to find the desired document due to restrictions of the size or resolution of the display window. Therefore, there is a need for methods for the user to look for a desired document more easily and conveniently.

SUMMARY OF THE INVENTION

Aspects of the present invention provide a document processing apparatus capable of analyzing a scanned document and generating a key index from a text area of the scanned document, and a method for processing a document using the same.

Additional aspects and/or advantages of the invention will be set forth in part in the description which follows and, in part, will be obvious from the description, or may be learned by practice of the invention.

According to an aspect of the present invention, a method for processing a document is provided. The method includes identifying a text area from a scanned document, extracting symbols from the identified text area, acquiring symbol-related information regarding each extracted symbol, dividing the extracted symbols into a plurality of groups based on a preset reference value regarding the symbol-related information, and generating a key index by arranging one group of symbols from among the divided groups.

According to another aspect of the present invention, the symbol-related information may be information regarding at least one of height, width, and stroke width of the corresponding extracted symbol.

According to another aspect of the present invention, the dividing of the extracted symbols into several groups comprises dividing the extracted symbols into several groups based on a first reference value indicating a sum of the height and width of the corresponding extracted symbol, and a second reference value indicating the stroke width of the corresponding extracted symbol.

According to another aspect of the present invention, the method may further include extracting position information regarding each symbol in the text area, wherein in generating the key index, the one group of symbols may be arranged based on the extracted position information regarding each symbol.

According to another aspect of the present invention, the acquiring of the symbol-related information comprises acquiring a most frequently used stroke width may be acquired as the symbol-related information, if the symbol-related information is information regarding stroke width of the corresponding extracted symbol and if there are a wide variety of stroke widths of the corresponding extracted symbol.

According to another aspect of the present invention, the generating of the key index comprises storing the generated key index in an image file format separately from the scanned document, or in a header area of the scanned document in an image file format.

According to another aspect of the present invention, the method may further include enlarging and displaying at least one of the stored key index and an image area of the scanned document if an event to search for the scanned document occurs.

According to another aspect of the present invention, a document processing apparatus is provided. The apparatus includes a symbol-related information acquirement unit to identify a text area in a scanned document, to extract symbols from the identified text area, and to acquire symbol-related information regarding each extracted symbol, a symbol division unit to divide the extracted symbols into several groups based on a preset reference value regarding the symbol-related information, and a key index generation unit to generate a key index by arranging one group of symbols from among the divided groups.

According to another aspect of the present invention, the symbol-related information may be information regarding at least one of height, width, and stroke width of the corresponding extracted symbol.

According to an aspect of the present invention, the symbol division unit may divide the extracted symbols into several groups based on a first reference value indicating a sum of the height and width of the corresponding extracted symbol, and a second reference value indicating the stroke width of the corresponding extracted symbol.

According to another aspect of the present invention, the apparatus may further include a position information extraction unit which extracts position information regarding each symbol in the text area, wherein the key index generation unit arranges the one group of symbols based on the extracted position information regarding each symbol.

According to another aspect of the present invention, if the symbol-related information is information regarding stroke width of the corresponding extracted symbol and if there are a wide variety of stroke widths of the corresponding extracted symbol, the symbol-related information acquirement unit may acquire a most frequently used stroke width as the symbol-related information.

According to another aspect of the present invention, the apparatus may further include a storage unit to store the generated key index in an image file format separately from the scanned document, or in a header area of the scanned document in an image file format.

According to another aspect of the present invention, the apparatus may further include a user interface (UI) unit to enlarge and display at least one of the stored key index and an image area of the scanned document if an event to search for the scanned document occurs.

According to another aspect of the present invention, a document processing apparatus is provided. The document processing apparatus includes a scanning unit which scans a document, a main board unit which generates a key index by comparing the size of symbols in a text area of the scanned document, and a storage unit which stores the generated key index.

According to another aspect of the present invention, the main board unit may extract the symbols from the text area of the scanned document, acquire symbol-related information, divide the extracted symbols into several groups according to the size of the symbols, and generate the key index in which one group of symbols from among the divided groups is arranged.

According to an aspect of the present invention, the main board unit may divide the extracted symbols into several groups based on a first reference value indicating a sum of the height and width of the symbol, and a second reference value indicating the stroke width of the symbol.

According to an aspect of the present invention, if position information regarding each symbol in the text area is extracted, the main board unit may arrange the one group of symbols based on the extracted position information regarding each symbol.

According to another aspect of the present invention, a method for processing a document is provided. The method includes identifying a text area in a scanned document, extracting symbols suitable for a key index from the identified text area, storing the key index in an image file format separately from the scanned document, or in a header area of the scanned document in an image file format, and enlarging and displaying at least one of the stored key index and an image area of the scanned document if an event to search for the scanned document occurs.

According to another aspect of the present invention, the method may further include acquiring symbol-related information for each extracted symbol, the symbol-related information being information regarding at least one of height, width, and stroke width of the corresponding extracted symbol.

According to another aspect of the present invention, the method may further include dividing the extracted symbols into several groups based on a first reference value indicating a sum of the height and width of the corresponding extracted symbol, and a second reference value indicating the stroke width of the corresponding extracted symbol, according to a preset reference value regarding the symbol-related information.

According to another aspect of the present invention, the method may further include extracting position information regarding each symbol in the text area, dividing the extracted symbols into several groups based on a preset reference value regarding symbol-related information, and generating the key index by arranging one group of symbols from among the divided groups based on the extracted position information regarding each symbol.

According to another aspect of the present invention, the acquiring of the symbol-related information comprises acquiring a most frequently used stroke width may be acquired as the symbol-related information if the symbol-related information is information regarding stroke width of the corresponding extracted symbol and if there are a wide variety of stroke widths of the corresponding extracted symbol.

According to another aspect of the present invention, a document processing apparatus is provided. The document process apparatus includes a symbol extraction unit to identify a text area in a scanned document, and to extract symbols suitable for a key index from the identified text area, a storage unit to store the key index in an image file format separately from the scanned document, or in a header area of the scanned document in an image file format, and a user interface (UI) unit to enlarge and displays at least one of the stored key index and an image area of the scanned document if an event to search for the scanned document occurs.

According to another aspect of the present invention, the symbol extraction unit may acquire symbol-related information for each of the extracted symbols, the symbol-related information being information regarding at least one of height, width, and stroke width of the corresponding extracted symbol.

According to another aspect of the present invention, the apparatus may further include a symbol division unit to divide the extracted symbols into several groups based on a first reference value indicating a sum of the height and width of the corresponding extracted symbol, and a second reference value indicating the stroke width of the corresponding extracted symbol, according to a preset reference value regarding the symbol-related information.

According to another aspect of the present invention, the apparatus may further include a position information extraction unit to extract position information regarding each symbol in the text area, a symbol division unit to divide the extracted symbols into several groups based on a preset reference value regarding symbol-related information, and a key index generation unit to generate the key index by arranging one group of symbols from among the divided groups based on the extracted position information regarding each symbol.

According to another aspect of the present invention, if the symbol-related information is information regarding stroke width of the corresponding extracted symbol and if there are a wide variety of stroke widths of the corresponding extracted symbol, the symbol extraction unit may acquire a most frequently used stroke width as the symbol-related information.

In addition to the embodiments and aspects as described above, further aspects and embodiments will be apparent by reference to the drawings and by study of the following descriptions.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
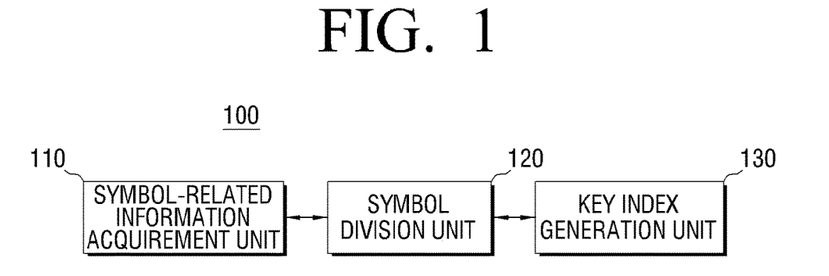
FIG. 1 is a schematic block diagram of a document processing apparatus according to an embodiment of the present invention.

FIG. 1 is a block diagram of a document processing apparatus according to an embodiment of the present invention. The document processing apparatus 100 may be implemented as an image forming apparatus, and more specifically as software or hardware in an image forming apparatus. The image forming apparatus may be a multifunction peripheral having a scanning function. The document processing apparatus may also be a host device connected to an image forming apparatus or scanner.

Referring to FIG. 1, the document processing apparatus 100 may include a symbol-related information acquirement unit 110, a symbol division unit 120, and a key index generation unit 130. According to other aspects of the present invention, the document processing apparatus may include additional and/or different units. For example, the document processing apparatus may include an image forming unit (not shown) or a scanning unit (not shown). Similarly, the functionality of two or more of the above units may be integrated into a single component.

The symbol-related information acquirement unit 110 identifies a text area from a scanned document, extracts symbols from the identified text area, and acquires symbol-related information. The symbol division unit 120 divides the extracted symbols into several groups based on a preset reference value regarding symbol-related information. The key index generation unit 130 arranges one group of symbols from among the groups divided by the symbol division unit 120, and generates a key index.

The scanned document is pre-stored in the document processing apparatus 100 in an image file format such as JPG or Joint Photographic Experts Group (JPEG). The scanned document may be a mixed document having an image area and a text area, or a document having only a text area. The image area may include graphics or photographs.

The symbol is an object having connectivity, for example, A, B, C, and the like. In case of 'i', symbols '•' and 'l' are separated, and are thus separate symbols.

Figure 2:
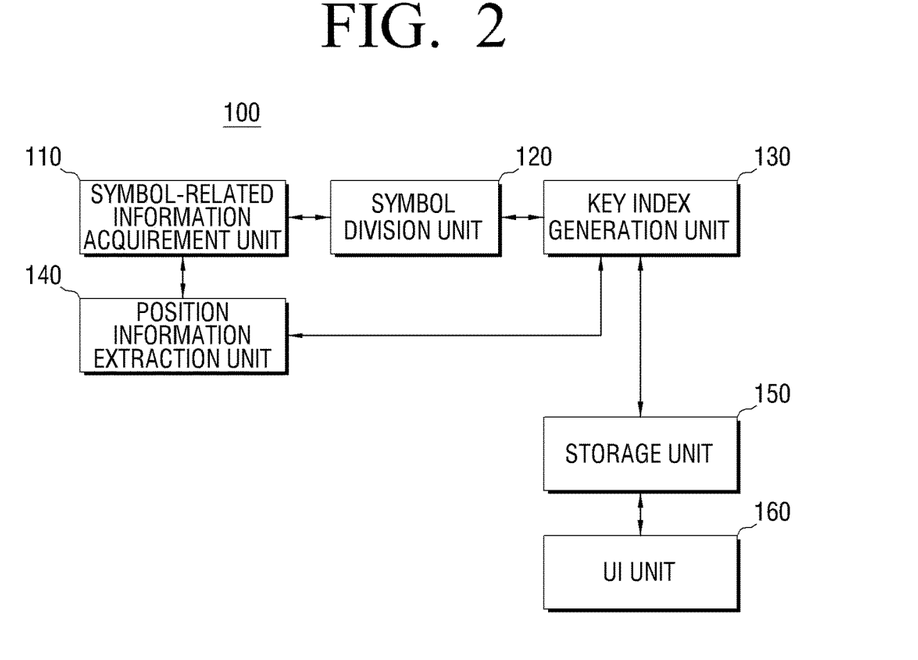
FIG. 2 is a more detailed block diagram of the document processing apparatus of FIG. 1.

FIG. 2 is a more detailed block diagram of the document processing apparatus of FIG. 1. The document processing apparatus of FIG. 2 may further include a position information extraction unit 140, a storage unit 150, and a user interface (UI) unit 160, in addition to the components of the document processing apparatus of FIG. 1.

The position information extraction unit 140 extracts position information regarding symbols in the text area. The storage unit 150 stores the generated key index in an image file format separately from the scanned document, or stores the generated key index in a header area of the scanned document in an image file format. The UI unit 160 enlarges and displays the stored key index, the image area of the scanned document, or both, if an event to search for the scanned document occurs.

Figure 3:
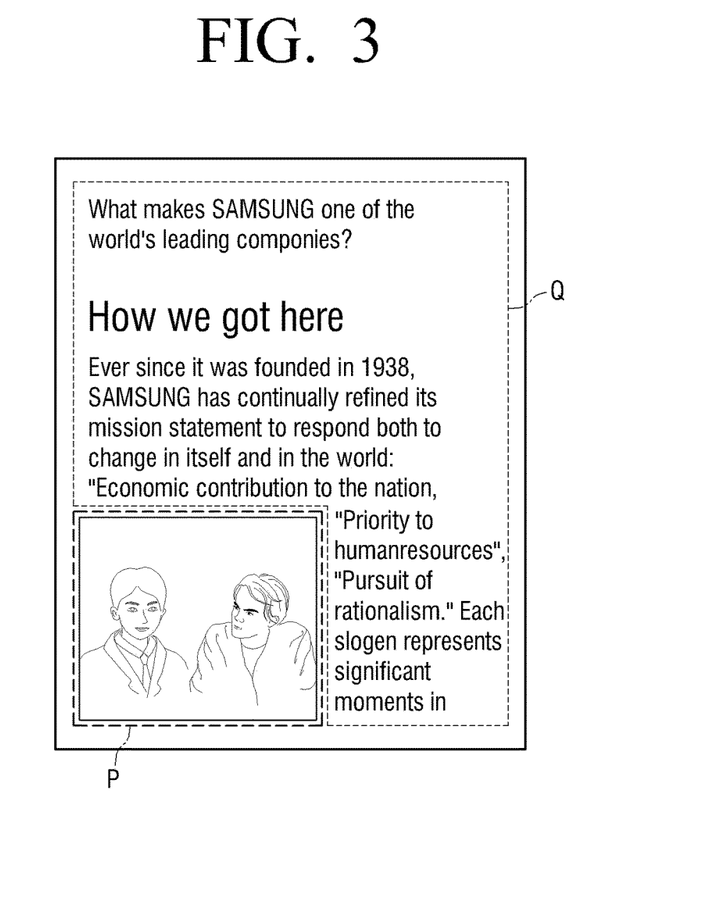
FIG. 3 illustrates a process for identifying a text area from a scanned document.
Figure 4:
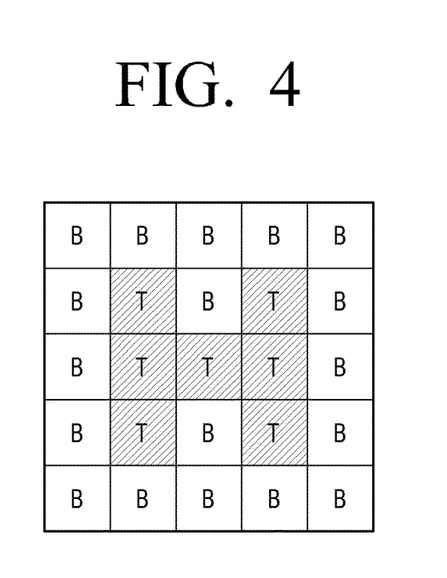
FIG. 4 illustrates a process for extracting a symbol from a text area.
Figure 5A:
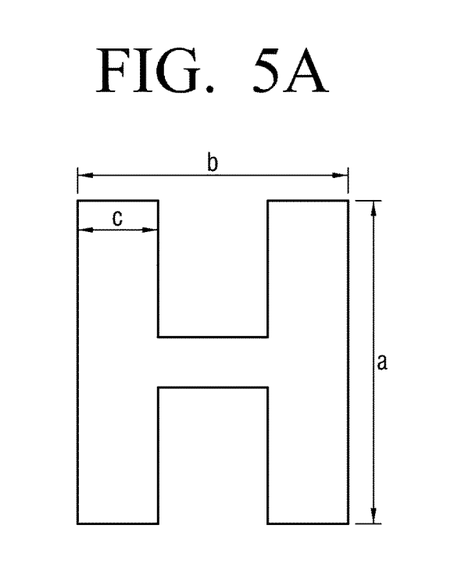
FIGS. 5A and 5B illustrate symbol-related information.
Figure 5B:
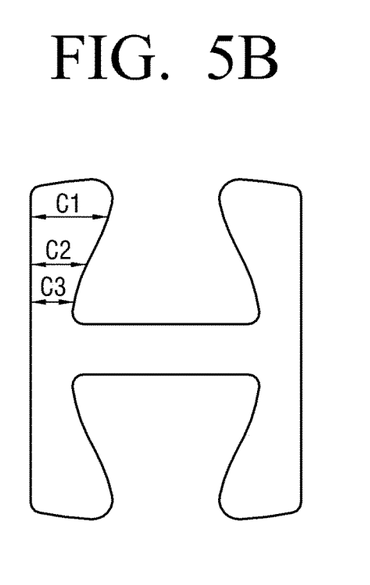
Figure 6:
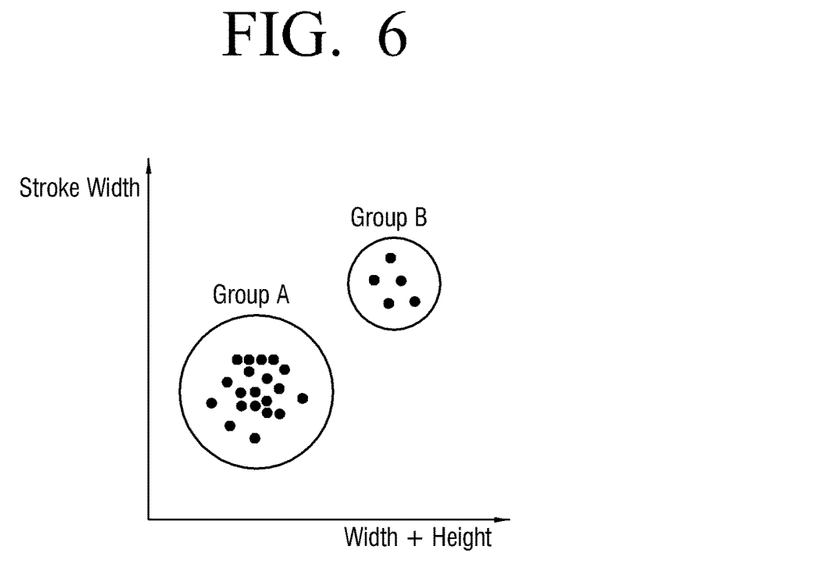
FIG. 6 illustrates a process for grouping extracted symbols.
Figure 7:
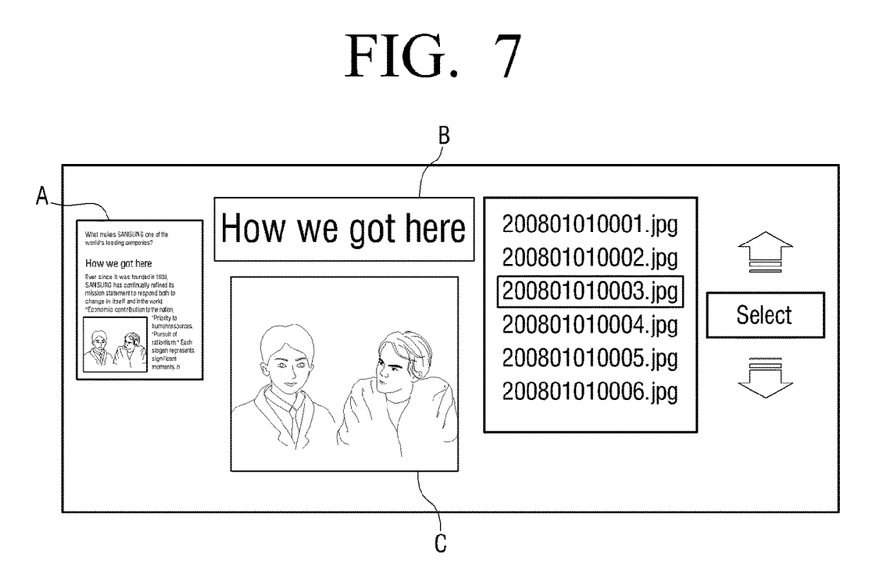
FIG. 7 illustrates an example of a UI unit.

FIG. 3 illustrates a process for identifying a text area from a scanned document, FIG. 4 process a method for extracting a symbol from a text area, FIGS. 5A and 5B illustrate symbol-related information, FIG. 6 illustrates a process for grouping extracted symbols, and FIG. 7 illustrates an example of a UI unit. The operation of the document processing apparatus 100 is described below in greater detail with reference to FIGS. 3 to 7.

The symbol-related information acquirement unit 110 identifies a text area from a scanned document. If the scanned document is a mixed document, the symbol-related information acquirement unit 110 can divide the scanned document into an image area (P) and a text area (Q) as shown in FIG. 3.

In this case, the image area (P) and the text area (Q) can be separated using known technologies, such as a method using change in the brightness of each pixel, a method for dividing the scanned document into blocks and using characteristics of each block, and a method using edgeness, or the like.

For example, in a method using change in the brightness of each pixel, an RGB value of the image forming apparatus is converted into a color space such as YCbCr, and pixels can be clear by low pass filtering. Subsequently, based on a first threshold value and a second threshold value, if the brightness is lower than the first threshold value, a pixel may be indicated as text (T). If the brightness is between the first threshold value and the second threshold value, a pixel may be indicated as image (I), and if the brightness is higher than the second threshold value, a pixel may be indicated as background (B). Accordingly, the entire pixels of the scanned document may be divided into an image area, a text area, and a background area, among which the background area may be regarded as a text area. If the scanned document has only a text area (Q), the text area (Q) is identified.

The symbol-related information acquirement unit 110 extracts symbols from the identified text area (Q). For example, FIG. 4 illustrates that symbol 'H' is included in the scanned document. In FIG. 4, each block indicates a single pixel, B indicates background, and T indicates text. It can be determined whether each pixel is T or B by scanning each line from top to bottom. As illustrated in FIG. 4, if pixels around 'H' that is determined as T are determined as B, 'H' may be a symbol that is an object having connectivity. In this manner, a symbol is extracted from a text area using 8-neighborhood connected component.

The symbol-related information acquirement unit 110 acquires symbol-related information. Referring to FIGS. 5A and 5B, symbol-related information is information regarding at least one of height (a), width (b), and stroke width (c), which represent the characteristics of a symbol. The symbol-related information acquirement unit 110 may extract a symbol by blocking only pixels indicating text as illustrated in FIG. 4. Accordingly, information regarding the height, width, and stroke width of the symbol can be measured directly.

However, since there are a wide variety of fonts, there may be a symbol having different stroke widths according to the type of symbol, as illustrated in FIG. 5B. In FIG. 5B, among the stroke widths such as c1, c2, and c3, the most frequently used stroke width may be selected as the stroke width of the symbol. Alternatively, an average of the stroke widths c1, c2, and c3 may be calculated as the stroke width of the symbol.

The symbol division unit 120 divides the extracted symbols into several groups based on a preset reference value regarding the symbol-related information. For example, the extracted symbols are grouped based on a first reference value indicating a sum of the height (a) and width (b) of a symbol, and a second reference value indicating a stroke width (c) of a symbol.

Referring to FIG. 6, the horizontal axis indicates a sum of the height (a) and width (b) of a symbol, and the vertical axis indicates a stroke width (c) of a symbol. Accordingly, as illustrated in FIG. 3, symbols H, O, W, W, E, . . . , constituting "HOW WE GOT HERE" expressed as comparatively large symbols in the text area (Q) of the scanned document may be grouped as Group B, and the remaining symbols except for "HOW WE GOT HERE" in the text area (Q) may be grouped as Group A.

Unlike the example in FIG. 3, if there are three types of symbols in the text area (Q) of the scanned document according to the symbol-related information, the symbols are divided into three groups. As described above, the extracted symbols can be grouped using a wide variety of grouping methods, such as K-means clustering.

The key index generation unit 130 arranges one group of symbols from among the groups divided by the symbol division unit 120, thereby generating a key index. As illustrated in FIG. 6, in order to generate a key index (such as "HOW WE GOT HERE") that can be easily recognized by a user among Group A and Group B, the key index generation unit 130 may arrange symbols H, O, W, W, E, . . . , of Group B.

The position information extraction unit 140 extracts position information regarding symbols in the text area. If symbols having a plurality of pixels are blocked and extracted by the symbol-related information acquisition unit 110, the position information extraction unit 140 identifies a relative position value of each symbol using pre-stored coordinates of, for example, the highest leftmost position of each symbol. Accordingly, the key index generation unit 130 can arrange the symbols of Group B based on the extracted position information regarding the symbols.

The storage unit 150 stores the generated key index in an image file format separately from the scanned document, or stores the generated key index in a header area of the scanned document in an image file format. The storage unit 150 may be implemented as a hard disk drive (HDD), a flash memory, or other storage devices known to the art.

The storage unit 150 stores the generated key index (such as "HOW WE GOT HERE") in an image file format, separately from the pre-stored scanned document. In this case, the storage unit 150 may store link information that indicates that the pre-stored scanned document is connected with the key index.

Alternatively, if the pre-stored scanned document is an image file in a JPEG format, an image file including the key index (such as "HOW WE GOT HERE") may be stored in an empty space of the JPEG header.

The UI unit 160 enlarges and displays at least one of the stored key index and the image area of the scanned document if an event to search for the scanned document occurs. Referring to FIG. 7, the UI unit 160 may display an image (B) of the key index and an image (C) of the pre-stored scanned document, in addition to a thumbnail image (A).

For example, the UI unit 160 enlarges and displays at least one of the image (B) of the key index and the image (C) of the pre-stored scanned document. Alternatively, if an event to search for the scanned document occurs, the UI unit 160 firstly displays the thumbnail image (A), and then enlarges and displays at least one of the image (B) of the key index and the image (C) of the pre-stored scanned document by manipulating a trigger button (not shown). In this case, in order to search for a document more easily, at least the image (B) of the key index may be displayed.

As described above, the document processing apparatus 100 detects a key index in a scanned document and displays the key index on a UI window, so that the user can search for a desired document more conveniently.

Figure 8:
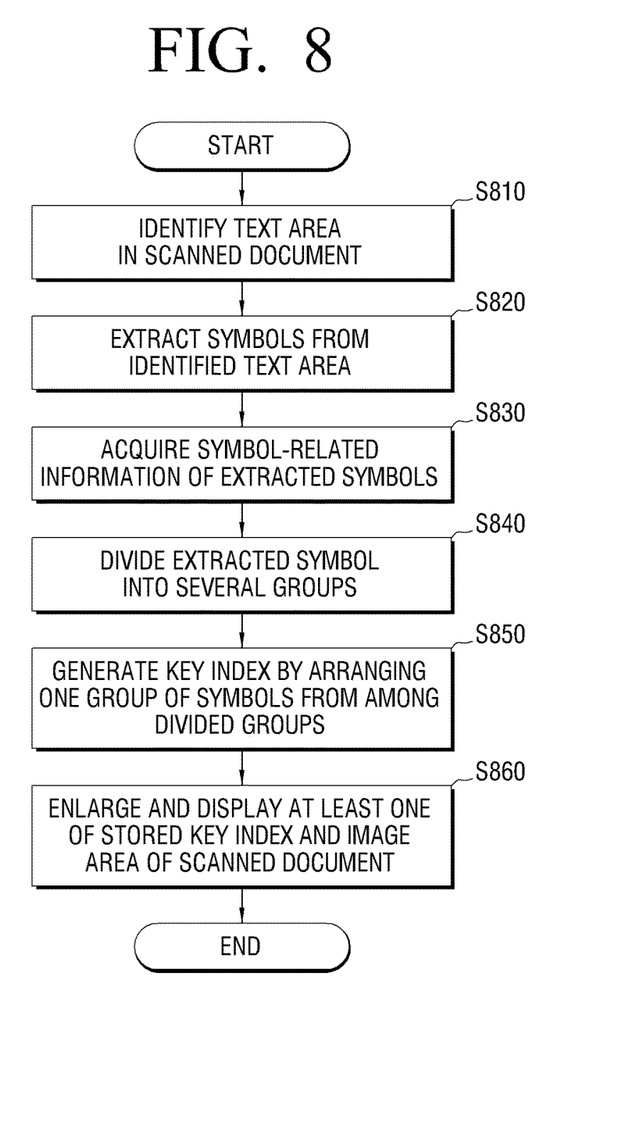
FIG. 8 is a flowchart of a process for processing a document according to an embodiment of the present invention.

FIG. 8 is a flowchart of a process for processing a document according to an embodiment of the present invention. Referring to FIG. 8, in a process for processing a document according to an embodiment of the present invention, the symbol-related information acquirement unit 110 identifies a text area in a scanned document in operation S810, extracts symbols from the identified text area in operation S820, and acquires symbol-related information of the extracted symbols in operation S830.

In operation S840, the symbol division unit 120 divides the extracted symbols into several groups based on a preset reference value regarding symbol-related information. Subsequently, in operation S850, a key index is generated by arranging one group of symbols from among the divided groups. The group of symbols is a group of symbols which can be easily recognized by the user. Later, in operation S860, the UI unit 160 enlarges and displays at least one of the stored key index and an image area of the scanned document (i.e., the stored key index, an image area of the scanned document, or both the key index and the image area of the scanned document.)

FIG. 8 does not illustrate the operation of the position information extraction unit 140 extracting position information regarding the symbols in the text area, but this operation can be performed any time before performing operation S850 in which the key index is generated.

Figure 9:
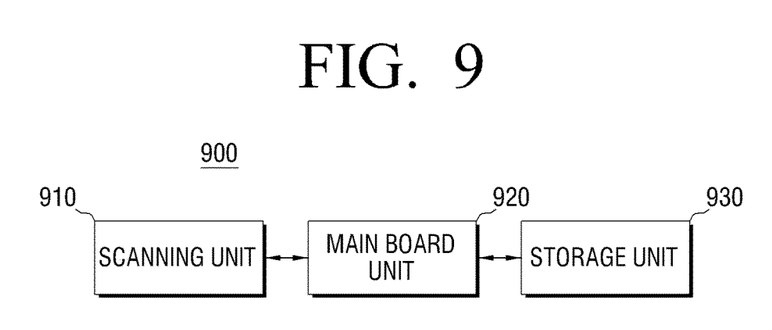
FIG. 9 is a schematic block diagram of a document processing apparatus according to another embodiment of the present invention.

FIG. 9 is a schematic block diagram of a document processing apparatus according to another embodiment of the present invention. Referring to FIG. 9, the document processing apparatus 900 may include a scanning unit 910, a main board unit 920, and a storage unit 930.

The scanning unit 910 scans a document. The main board unit 920 compares the size of each symbol in a text area of the scanned document, thereby generating a key index. The storage unit 930 stores the generated key index.

The main board unit 920 extracts symbols from the text area of the scanned document, acquires symbol-related information, divides the extracted symbols into several groups according to the size of each symbol, and generates a key index in which one group of symbols from among the divided groups is arranged. Alternatively, the main board unit 920 divides the extracted symbols into several groups based on a first reference value indicating a sum of the height and width of a symbol, and a second reference value indicating a stroke width of a symbol. If position information regarding the symbols in the text area is extracted, the main board unit 920 arranges one group of symbols based on the extracted position information regarding the symbols, and generates a key index.

A document processing apparatus according to yet another embodiment of the present invention may include a symbol extraction unit, a storage unit, and a UI unit. Since this embodiment is slightly modified from the embodiment illustrated in FIGS. 1 and 2, the contents illustrated in FIGS. 1 and 2 can be identically used.

The symbol extraction unit identifies a text area from a scanned document, and extracts symbols suitable for a key index the identified text area based on a pre-set reference from. In this embodiment, the symbol extraction unit performs the same function as the symbol-related information acquirement unit 110.

The storage unit 150 stores the key index in an image file format separately from the scanned document, or stores the key index in a header area of the scanned document in an image file format. The UI unit 160 enlarges and displays at least one of the stored key index and an image area of the scanned document if an event to search for the scanned document occurs.

This document processing apparatus according to yet another embodiment of the present invention can include the symbol extraction unit, the storage unit, and the UI unit. Accordingly, symbols suitable for a key index are extracted, the key index is stored, and either the stored key index, an image area of the scanned document, or both, can be enlarged and displayed.

The symbol extraction unit acquires symbol-related information which is information regarding the height, width, and/or stroke width of a symbol. In case of symbol-related information regarding the stroke width of a symbol, if the stroke width of the symbol is not regular, the symbol extraction unit selects the most frequently used stroke width from among a wide variety of stroke widths as the symbol-related information.

The symbol division unit 120 divides symbols, which are extracted based on a first reference value indicating a sum of the height and width of a symbol, and a second reference value indicating a stroke width of a symbol, into several groups based on a preset reference value regarding the symbol-related information.

The position information extraction unit 140 extracts position information regarding symbols in the text area. If the symbol division unit 120 divides the extracted symbols into several groups based on a preset reference value regarding the symbol-related information, the key index generation unit 130 can arrange one group of symbols based on the extracted position information regarding the symbols, so that a key index is generated.

Figure 10:
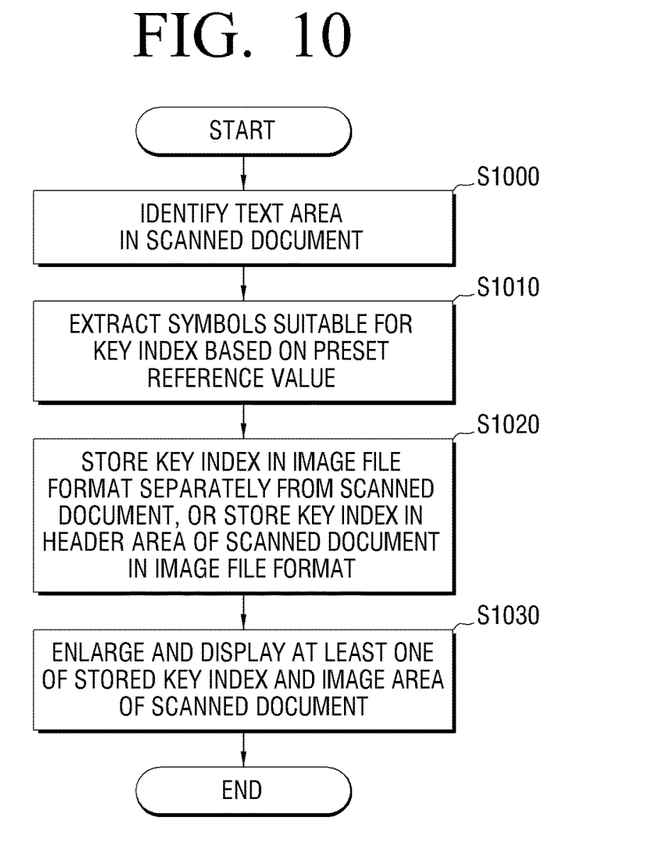
FIG. 10 is a flowchart of a process for processing a document according to another embodiment of the present invention.

FIG. 10 is a flowchart of a process for processing a document according to another embodiment of the present invention. Referring to FIG. 10, the symbol extraction unit identifies a text area in a scanned document in operation S1000, and symbols suitable for a key index are extracted from the identified text area based on a preset reference value in operation S1010.

Subsequently, in operation S1020, the storage unit 150 stores the key index in an image file format separately from the scanned document, or stores the key index in a header area of the scanned document in an image file format.

In operation S1030, the UI unit 160 enlarges and displays at least one of the stored key index and an image area of the scanned document if an event to search for the scanned document occurs.

As illustrated in FIG. 10, this method for processing a document according to yet another embodiment of the present invention can include only the identifying operation S1000, the extracting operation S1010, the storing operation S1020, and the displaying operation S1030.

In addition, since this embodiment is slightly modified from the embodiment illustrated in FIG. 8, description of overlapping parts is not repeated.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for processing a document, the method comprising:
   identifying a text area from a scanned document;
   extracting symbols from the identified text area;
   acquiring symbol-related information regarding each extracted symbol by a symbol-related information acquirement unit;
   dividing the extracted symbols, by a symbol division unit, into a plurality of groups based on a preset reference value regarding the symbol-related information; and
   generating a key index by a key index generation unit by arranging one group of symbols from among the divided groups,
   wherein the symbol-related information is information regarding at least one of height, width, and stroke width of the corresponding extracted symbol.

2. The method according to claim 1, wherein the dividing of the extracted symbols into several groups comprises dividing the extracted symbols into several groups based on a first reference value indicating a sum of the height and width of the corresponding extracted symbol, and a second reference value indicating the stroke width of the corresponding extracted symbol.

3. The method according to claim 1, further comprising:
   extracting position information regarding each symbol in the text area,
   wherein in generating the key index, the one group of symbols is arranged based on the extracted position information regarding each symbol.

4. The method according to claim 1, wherein the acquiring of the symbol-related information comprises acquiring a most frequently used stroke width as the symbol-related information, if the symbol-related information is information regarding stroke width of the corresponding extracted symbol and if there are a plurality of stroke widths of the corresponding extracted symbol.

5. The method according to claim 1, wherein the generating of the key index comprises storing the generated key index in an image file format separately from the scanned document, or in a header area of the scanned document in an image file format.

6. The method according to claim 5, further comprising:
   enlarging and displaying at least one of the stored key index and an image area of the scanned document if an event to search for the scanned document occurs.

7. A document processing apparatus, comprising:
   a symbol-related information acquirement unit to identify a text area from a scanned document, extract symbols from the identified text area, and acquire symbol-related information regarding each extracted symbol;
   a symbol division unit to divide the extracted symbols into a plurality of groups based on a preset reference value regarding the symbol-related information; and
   a key index generation unit to generate a key index by arranging one group of symbols from among the divided groups,
   wherein the symbol-related information is information regarding at least one of height, width, and stroke width of the corresponding extracted symbol.

8. The apparatus according to claim 7, wherein the symbol division unit divides the extracted symbols into several groups based on a first reference value indicating a sum of the height and width of the corresponding extracted symbol, and a second reference value indicating the stroke width of the corresponding extracted symbol.

9. The apparatus according to claim 7, further comprising:
   a position information extraction unit to extract position information regarding each symbol in the text area,
   wherein the key index generation unit arranges the one group of symbols based on the extracted position information regarding each symbol.

10. The apparatus according to claim 7, wherein if the symbol-related information is information regarding stroke width of the corresponding extracted symbol and if there are a wide variety of stroke widths of the corresponding extracted symbol, the symbol-related information acquirement unit acquires a most frequently used stroke width as the symbol-related information.

11. The apparatus according to claim 7, further comprising:
   a storage unit to store the generated key index in an image file format separately from the scanned document, or in a header area of the scanned document in an image file format.

12. The apparatus according to claim 11, further comprising:
   a user interface (UI) unit to enlarge and display at least one of the stored key index and an image area of the scanned document if an event to search for the scanned document occurs.

* * * * *